United States Patent
Hsu

(10) Patent No.: US 8,988,910 B2
(45) Date of Patent: Mar. 24, 2015

(54) ALTERNATING-CURRENT CONVERSION SYSTEM HAVING LOW POWER CONSUMPTION BLEEDER CIRCUIT

(71) Applicant: Niko Semiconductor Co., Ltd., New Taipei (TW)

(72) Inventor: Ta-Ching Hsu, Taipei (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 213 days.

(21) Appl. No.: 13/787,354

(22) Filed: Mar. 6, 2013

(65) Prior Publication Data

US 2014/0169047 A1 Jun. 19, 2014

(30) Foreign Application Priority Data

Dec. 17, 2012 (TW) .............................. 101147853 A

(51) Int. Cl.
| | |
|---|---|
| H02M 7/06 | (2006.01) |
| H02M 1/12 | (2006.01) |
| H02M 7/04 | (2006.01) |
| H02M 1/32 | (2007.01) |

(52) U.S. Cl.
CPC .......... *H02M 7/04* (2013.01); *H02M 2001/322* (2013.01)
USPC ............................................ 363/126; 363/44

(58) Field of Classification Search
USPC ................. 363/37, 39, 44–49, 79–81, 84, 89, 363/125–127
See application file for complete search history.

(56) References Cited

U.S. PATENT DOCUMENTS

| | | | |
|---|---|---|---|
| 5,568,041 A * | 10/1996 | Hesterman | 323/207 |
| 6,069,805 A * | 5/2000 | Anderson, Jr. | 363/49 |
| 8,488,355 B2 * | 7/2013 | Berghegger | 363/127 |
| 8,884,537 B2 * | 11/2014 | Liao et al. | 315/200 R |
| 2005/0052886 A1 * | 3/2005 | Yang et al. | 363/49 |
| 2005/0248968 A1 * | 11/2005 | Chang | 363/125 |
| 2008/0037296 A1 * | 2/2008 | Hsu et al. | 363/41 |
| 2010/0321964 A1 * | 12/2010 | Brinlee et al. | 363/21.18 |
| 2011/0116203 A1 * | 5/2011 | Chan et al. | 361/220 |
| 2011/0122668 A1 * | 5/2011 | Lo et al. | 363/126 |
| 2012/0008354 A1 * | 1/2012 | Tang | 363/126 |
| 2012/0126714 A1 * | 5/2012 | Deppe et al. | 315/192 |
| 2012/0207505 A1 * | 8/2012 | Kobayashi et al. | 399/88 |
| 2012/0243262 A1 * | 9/2012 | Ger et al. | 363/15 |
| 2012/0294048 A1 * | 11/2012 | Brinlee | 363/21.18 |
| 2012/0299572 A1 * | 11/2012 | Eom et al. | 323/312 |
| 2013/0094255 A1 * | 4/2013 | Yeh et al. | 363/44 |
| 2013/0170261 A1 * | 7/2013 | Lee et al. | 363/126 |
| 2013/0278159 A1 * | 10/2013 | Del Carmen et al. | 315/200 R |
| 2013/0335038 A1 * | 12/2013 | Lee et al. | 320/166 |

* cited by examiner

*Primary Examiner* — Nguyen Tran
*Assistant Examiner* — Yusef Ahmed
(74) *Attorney, Agent, or Firm* — Li & Cai Intellectual Property (USA) Office

(57) ABSTRACT

A low power consumption bleeder circuit is disclosed, and it is coupled to an alternating-current (AC) power source, an input filtering capacitor, and a rectifying filter. The low power consumption bleeder circuit includes a first switch component, a second switch component, and a controller. The first switch component is coupled to a first input terminal of the AC power source and a first connection terminal of the rectifying filter. The second switch component is coupled to a second input terminal of the AC power source and the first connection terminal of the rectifying filter. When the AC power source is detected to be removed, the controller controls at least one of the first switch component and the second switch component to be conductive.

8 Claims, 6 Drawing Sheets

ALTERNATING-CURRENT CONVERSION SYSTEM HAVING LOW POWER CONSUMPTION BLEEDER CIRCUIT

BACKGROUND OF THE INVENTION

1. Field of the Invention

The present invention relates to an alternating-current (AC) conversion system; in particular, to an AC conversion system having a low power consumption bleeder circuit.

2. Description of Related Art

The power system used in the household appliances or the information products usually includes a power converter for providing various kinds of power voltages required by the products. The input of the power converter is generally provided by the main alternating-current (AC) power source. After passing through an electromagnetic interference (EMI) filtering circuit, designed to include inductors and the capacitors, and rectifier, the main AC power voltage is converted to the demanded power voltages, such as direct-current (DC) voltage 19V or 5V, etc. However, when the AC power source is removed and does not provide power supply, the electric power may still be stored in the inner capacitors. For ensuring safety, the general safety voltage specification restricts that the voltage of the inner capacitor should be reduced to lower than 37% of the original value within one second. Thus, a bleeder component is installed within the circuits for bleeding the electric power stored in the inner capacitors. Conventionally, a resistor may be disposed between the two input terminals of the electric power for serving as the bleeder component. However, under normal power supply, the resistor may consume power corresponding to the value of the power voltage, and the total power consumptions thereof are hard to comply with the low power consumption standard.

SUMMARY OF THE INVENTION

The disclosure provides a low power consumption bleeder circuit coupled to an alternating-current (AC) power source, an input filtering capacitor, and a rectifying filter. The input filtering capacitor and the rectifying filter are coupled to a first input terminal and a second input terminal of the AC power source. The low power consumption bleeder circuit includes a first switch component which is coupled to the first input terminal of the AC power source and a first connection terminal of the rectifying filter; a second switch component which is coupled to the second input terminal of the AC power source and the first connection terminal of the rectifying filter; and a controller which controls at least one of the first switch component and the second switch component to be conductive when the AC power source is removed.

In an embodiment of the disclosure, the first connection terminal of the rectifying filter is connected to a ground voltage.

In an embodiment of the disclosure, the controller includes a first detection terminal and a second detection terminal which are connected with a first resistor and a second resistor, for detecting the first input terminal and the second input terminal of the AC power source, to determine whether the AC power source is removed or not.

In an embodiment of the disclosure, the controller includes a first voltage divider circuit connected with the second resistor; a second voltage divider circuit connected with the first resistor; a third switch component which includes a first terminal coupled to a control terminal of the first switch component, a second terminal coupled to the first connection terminal of the rectifying filter, and a control terminal coupled to the first voltage divider circuit; a fourth switch component which includes a first terminal coupled to a control terminal of the second switch component, a second terminal coupled to the first connection terminal of the rectifying filter, and a control terminal coupled to the second voltage division circuit; a capacitor which has two terminals respectively coupled to the first terminal of the third switch component and to the first terminal of the fourth switch component; a first current controller connected with the first resistor and the control terminal of the first switch component; and a second current controller connected with the second resistor and the control terminal of the second switch component.

In an embodiment of the disclosure, the first current controller and the second current controller are implemented by resistors or constant current sources.

In an embodiment of the disclosure, the low power consumption bleeder circuit further includes a first diode connected with the first terminal of the third switch component and the control terminal of the first switch component, and a second diode connected with the first terminal of the fourth switch component and the control terminal of the second switch component.

In an embodiment of the disclosure, the controller includes a first current controller which is connected with the first resistor and the control terminal of the first switch component; a first diode which is connected with the control terminal of the first switch component and the first input terminal of the AC power source; a first capacitor which is connected with the control terminal of the first switch component and the first connection terminal of the rectifying filter; a second current controller which is connected with the second resistor and the control terminal of the second switch component; a second diode which is connected with the control terminal of the second switch component and the second input terminal of the AC power source; and a second capacitor which is connected with the control terminal of the second switch component and the first connection terminal of the rectifying filter.

The disclosure provides an AC conversion system having a low power consumption bleeder circuit. The AC conversion system includes an AC power source, an input filtering capacitor, a rectifying filter, wherein the input filtering capacitor and the rectifying filter are coupled to a first input terminal and a second input terminal of the AC power source; an output circuit connected with a first connection terminal and a second connection terminal of the rectifying filter; and a low power consumption bleeder circuit. The low power consumption bleeder circuit includes a first switch component coupled to the first input terminal of the AC power source and the first connection terminal of the rectifying filter; a second switch component coupled to the second input terminal of the AC power source and the first connection terminal of the rectifying filter; and a controller controlling at least one of the first and the second switch components to be conductive when the AC power source is detected to be removed.

In an embodiment of the disclosure, the rectifying filter includes a filtering component coupled to the first and the second input terminals of the AC power source; and a rectifier connected with the filtering component, the controller, and the output circuit.

In an embodiment of the disclosure, the output circuit includes an output capacitor; and an output impedance which is connected in parallel with the output capacitor.

According to the low power consumption bleeder circuit and the AC conversion system having the low power consumption bleeder circuit shown by the disclosure, the power consumption can be greatly reduced.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

For further understanding of the present disclosure, reference is made to the following detailed description and drawings illustrating the embodiments and examples of the present disclosure. The one skilled in the art can change and modify the technologies shown in the disclosure after understanding the preferred embodiment thereof, and the modifications made do not exceed the spirits and scopes of the present disclosure.

Figure 1:
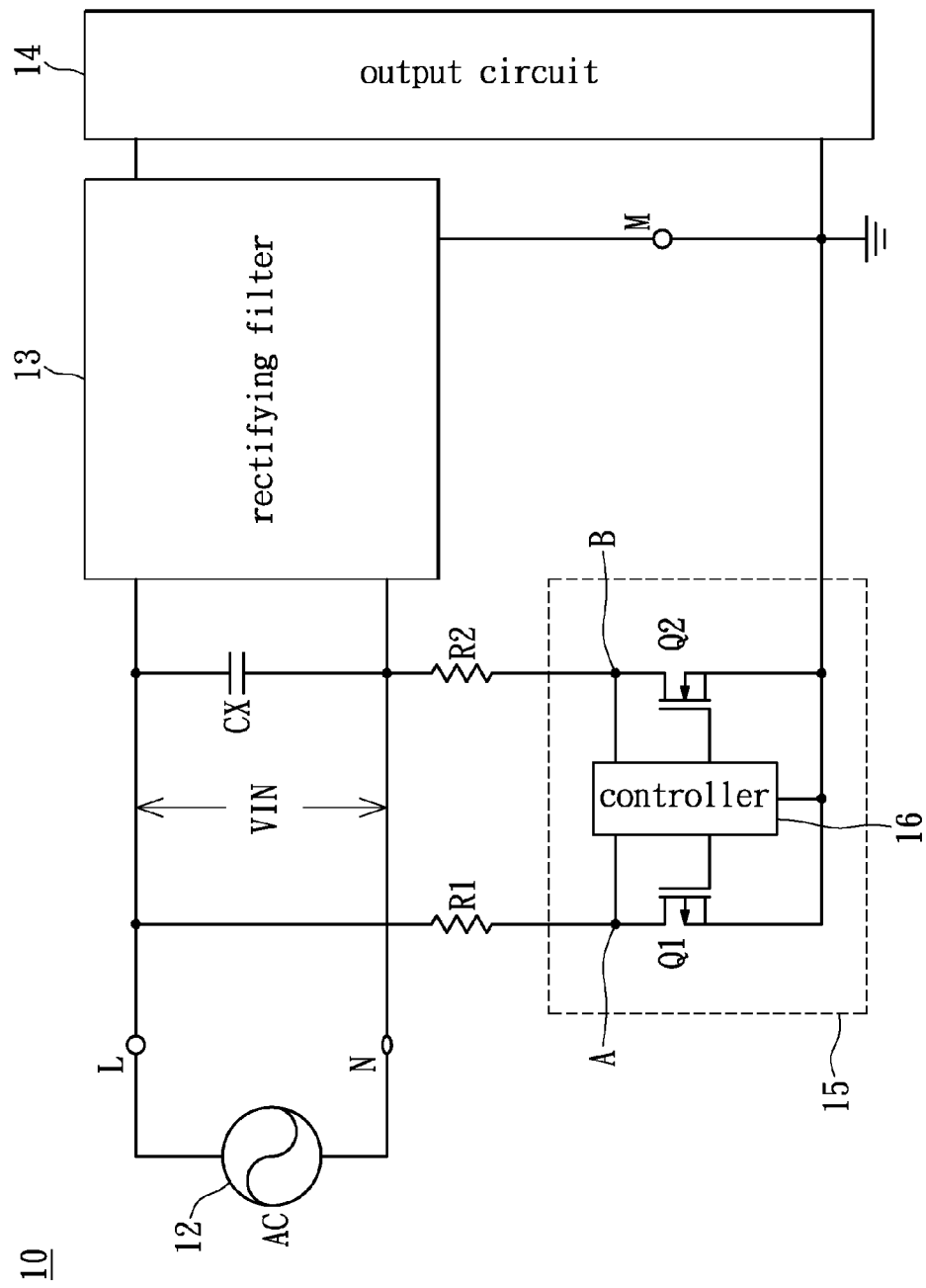
FIG. 1 shows an embodiment of an AC conversion system having a low power consumption bleeder circuit according to the disclosure.

Please refer to FIG. 1 which shows an embodiment of an alternating-current (AC) conversion system having a low power consumption bleeder circuit according to the disclosure. The AC conversion system 10 includes an AC power source 12, an input filtering capacitor CX, a rectifying filter 13, an output circuit 14, and a low power consumption bleeder circuit 15.

The AC power source 12 provides an input voltage VIN, such as 110V or 220V AC, and includes a first input terminal L and a second input terminal N which are connected with the input filtering capacitor CX and the rectifying filter 13. The input voltage VIN is outputted to the output circuit 14 after being processed by the rectifying filter 13.

The low power consumption bleeder circuit 15 includes a first switch component Q1, a second switch component Q2, and a controller 16. The first terminal of the first switch component Q1 is coupled to the first input terminal L of the AC power source 12, for example, the first terminal of the first switch component Q1 can be connected with the first input terminal L of the AC power source 12 through a first resistor R1. The second terminal of the first switch component Q1 is coupled to a first connection terminal M of the rectifying filter 13. The second switch component Q2 is coupled to the second input terminal N of the AC power source 12, for example, the second switch component Q2 can be connected with the second input terminal N of the AC power source 12 through a second resistor R2. The second terminal of the second switch component Q2 is coupled to the first connection terminal M of the rectifying filter 13. In an embodiment, the first connection terminal M of the rectifying filter 13 is connected with a ground voltage. The controller 16 is used for detecting whether the AC power source 12 is removed or not, and for controlling at least one of the first switch component Q1 and the second switch component Q2 to be conductive when the AC power source 12 is removed.

The controller 16 is connected with a first detection terminal A and a second detection terminal B, for respectively detecting the first input terminal L and the second input terminal N of the AC power source 12, to determine whether the AC power source 12 is removed or not. In an embodiment, the first and the second detection terminals are connected with the first input terminal L and the second input terminal N through the first resistor R1 and the second resistor R2 having protection functionalities, as shown in the figures. In another embodiment, the first and the second detection terminals can also be connected with the first input terminal L and the second input terminal N of the AC power source 12 directly, for detecting the connection statuses of the AC power source 12.

When the AC power source 12 is connected normally and provides electric power, the controller 16 controls with a signal the control terminals of the first switch components Q1 and the second switch component Q2, for example, making the first switch component Q1 and the second switch component Q2 be cut off, for avoiding the power consumptions caused by the resistors according to the voltage increasing and decreasing of the electric power. When the AC power source 12 is removed and does not provide electric power and after the controller 16 confirms that the AC power source 12 is removed according to detection of the first input terminal L and the second input terminal N, the controller 16 controls at least one of the first switch component Q1 and the second switch component Q2 to be conductive, so as to let the energy stored in the input filtering capacitor CX bleed rapidly through the first resistor R1 or the second resistor R2, the low power consumption bleeder circuit 15, and the rectifying filter 13, to comply with the demand of the safety voltage specifications.

Figure 2:
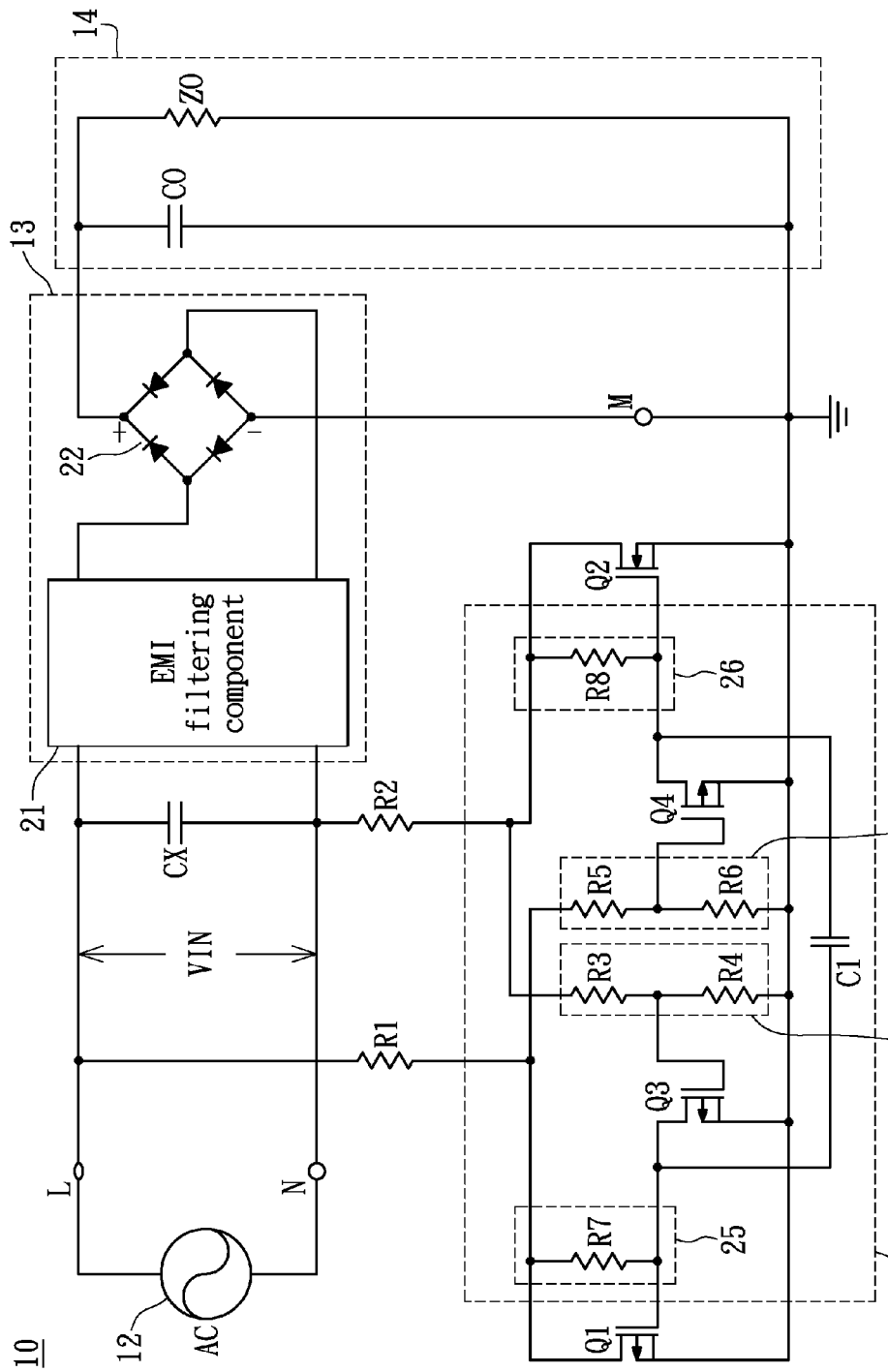
FIG. 2 shows a detail embodiment of the AC conversion system having the low power consumption bleeder circuit in FIG. 1 according to the disclosure.

Please refer to FIG. 2 which shows a detail embodiment of the AC conversion system having the low power consumption bleeder circuit in FIG. 1 according to the present disclosure. The same parts of FIG. 2 as in FIG. 1 are not repeatedly described. The rectifying filter 13 includes, for example, an electromagnetic interference (EMI) filtering component 21 and a rectifier 22. The EMI filtering component 21 is coupled to the first input terminal L and the second input terminal N of the AC power source 12. The rectifier 22 is, for example, a bridge rectifier including four diodes and four connection terminals, wherein two of the four connection terminals are connected with the EMI filtering component 21, and the other two of the four connection terminals are respectively connected with the controller 16 and the output circuit 14. In an embodiment, the output circuit 14 includes an output capacitor C0 and an output impedance Z0, and the output capacitor C0 and the output impedance Z0 are connected in parallel.

In addition, the controller 16 includes a first voltage divider circuit 23, a second voltage divider circuit 24, a third switch component Q3, a fourth switch component Q4, a capacitor C1, a first current controller 25, and a second current controller 26. The first voltage divider circuit 23 includes a third resistor R3 and a fourth resistor R4, which are serially connected, and is connected between the second resistor R2 and the first connection terminal M of the rectifying filter 13. The second voltage divider circuit 24 includes a fifth resistor R5 and a sixth resistor R6, and is connected between the first resistor R1 and the first connection terminal M of the rectifying filter 13.

The third switch component Q3 includes a first terminal coupled to a control terminal of the first switch component Q1, a second terminal coupled to the first connection terminal M of the rectifying filter 13, and a control terminal coupled between the third resistor R3 and the fourth resistor R4 of the first voltage divider circuit 23. The fourth switch component Q4 includes a first terminal coupled to a control terminal of the second switch component Q2, a second terminal coupled to the first connection terminal M of the rectifying filter 13, and a control terminal coupled between the fifth resistor R5 and the sixth resistor R6 of the second voltage division circuit 24.

In an embodiment, the capacitor C1 includes two terminals which are respectively connected with the first terminal of the third switch component Q3 and the first terminal of the fourth switch component Q4. In an embodiment, the first current controller 25, such as a resistor R7, is connected to the first resistor R1 and the control terminal of the first switch component Q1. The second current controller 26, such as a resistor R8, is connected to the second resistor R2 and the control terminal of the second switch component Q2.

Figure 3:
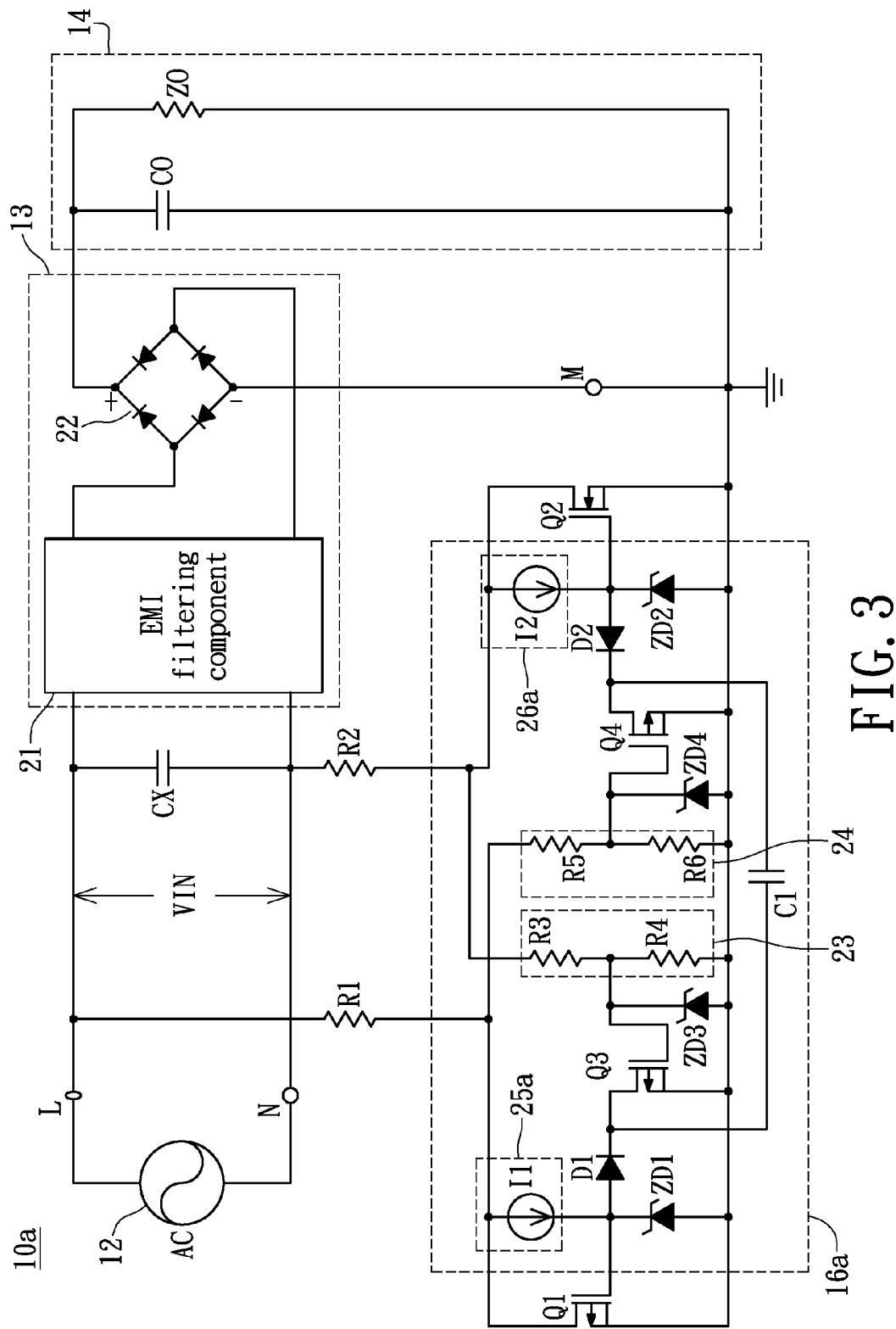
FIG. 3 shows another detail embodiment of the AC conversion system having the low power consumption bleeder circuit in FIG. 1 according to the disclosure.

Please refer to FIG. 3 which shows another detail embodiment of the AC conversion system having the low power consumption bleeder circuit according to FIG. 1. The same parts of FIG. 3 as in FIG. 2 are not repeatedly described. The differences between the controller 16a in FIG. 3 and the controller 16 in FIG. 2 are that the first current controller 25a is implemented with a constant current source I1 instead of the resistor R7 in FIG. 2, and the second current controller 26a is implemented with a constant current source I2 instead of the resistor R8 in FIG. 2. In addition, the four control terminals of the first switch component Q1, the second switch component Q2, the third switch component Q3, and the fourth switch component Q4 are connected respectively with a first Zener diode ZD1, a second Zener diode ZD2, a third Zener diode ZD3, and a fourth Zener diode ZD4 as the protection components for avoiding an over voltage.

Moreover, a first diode D1 is added and connected between the first terminal of the third switch component Q3 and the control terminal of the first switch component Q1. A second diode D2 is added and connected between the first terminal of the fourth switch component Q4 and the control terminal of the second switch component Q2. The first and the second diodes D1 and D2 are used for controlling and increasing the operation voltage of the gate nodes.

Figure 4:
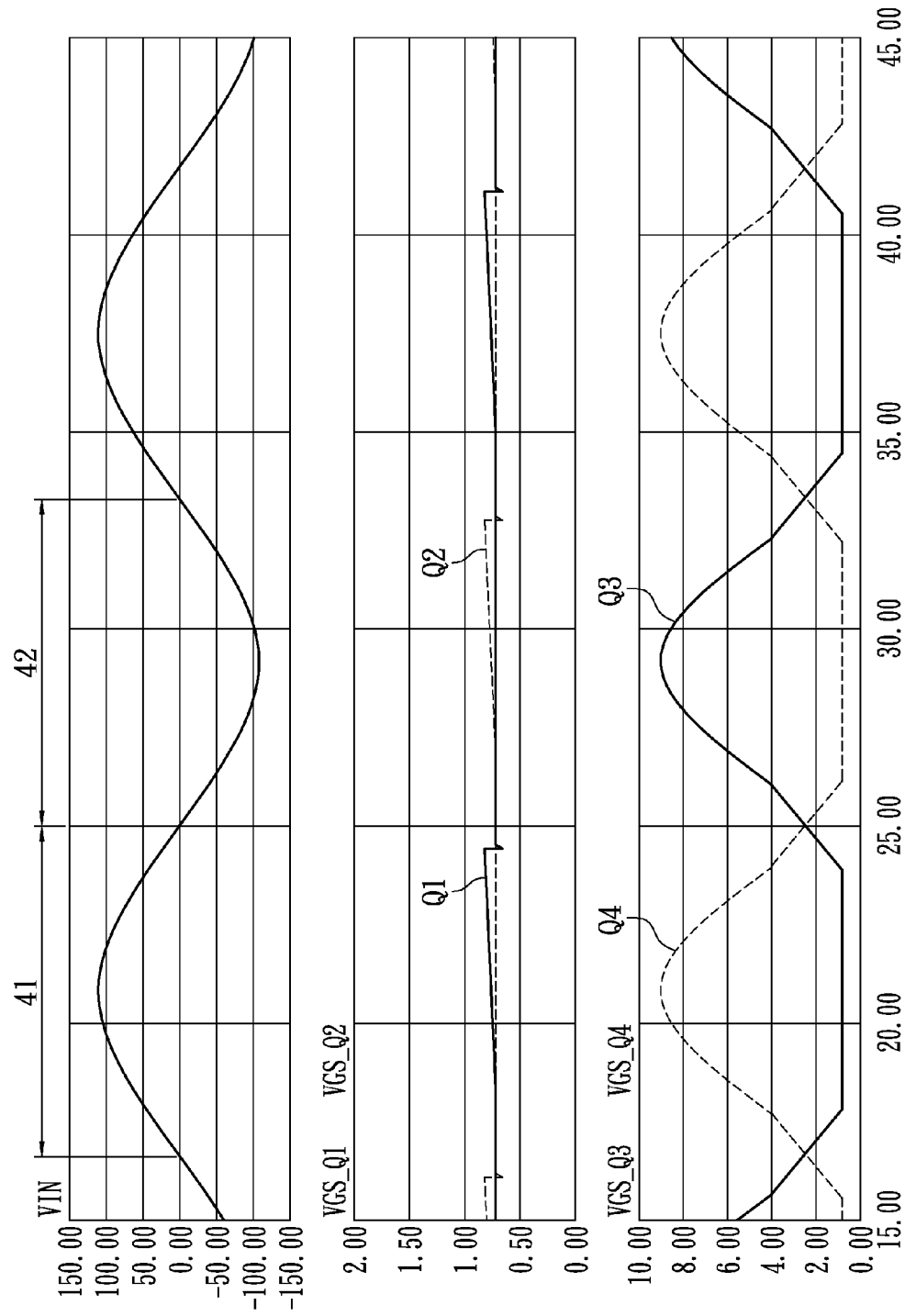
FIG. 4 shows a waveform diagram when the AC power source provides electric power normally according to an embodiment of the disclosure.

Then please refer to FIG. 4 which shows operation waveform diagrams of the AC power source when it provides electric power normally. Please refer to FIG. 4 along with FIG. 2, when the AC power source 12 is normally connected and provides electric power and if the phase of AC pulses at the first input terminal L is positive and the phase at the second input terminal N is negative (for example, the phases that are within the sine wave time interval 41 in the upper diagram of FIG. 4), the gate voltage VGS_Q4 of the control terminal of the fourth switch component Q4 (please refer to the Q4 in the lower diagram of FIG. 4) is divided by the resistors R1, R5, and R6 to acquire high voltage level pulses, so that the fourth switch component Q4 turns on. At this moment, the electric charges stored in the capacitor C1 are released and the gate voltage VGS_Q2 of the control terminal of the second switch component Q2 is remained at low voltage level which keeps the second switch component Q2 being cut off (please refer to the Q2 in the middle diagram of FIG. 4).

In another aspect, the gate voltage VGS_Q1 of the control terminal of the first switch component Q1 increases gradually because the capacitor C1 is charged through the resistors R1 and R7. Because of the high charging time constant formed by the capacitor C1 and the high resistance designs of the resistors R1 and R7, thus under the alternating changing of the phases of the AC pulses, the gate voltage VGS_Q1 of the first switch component Q1 will not increase to a voltage level (the Q2 in the middle diagram of FIG. 4) which can make the first switch component Q1 turn on. The voltage of the first input terminal L is charged to a high value in accordance with the changes of the sine wave, and then the charging of the capacitor C1 is stopped because of descending of the sine wave.

When the AC power source 12 is connected normally and provides electric power and the phases of the AC pulses are at inverted phase, that is, when the first input terminal L is negative and the second input terminal N is positive (for example, the sine wave time interval 42 in the upper diagram of FIG. 4), the gate voltage VGS_Q3 (please refer to Q3 in the lower diagram in FIG. 4) of the control terminal of the third switch component Q3 is divided by the resistors R2, R3, and R4 to acquire high voltage level pulses, thus makes the third switch component Q3 turn on. At this moment, the stored electric charges in the capacitor C1 are released, and the gate voltage VGS_Q1 of the first switch component Q1 is remained at low voltage level which keeps the first switch component Q1 turn off (please refer to Q1 in the middle diagram of FIG. 4).

In still another aspect, the gate voltage VGS_Q2 of the control terminal of the second switch component Q2 increases gradually because the capacitor C1 is charged through the resistors R2 and R8. Because of the high charging time constant caused by the capacitor C1 and the high resistance designs of the resistors R2 and R8, thus under the alternating changing of the phases of the AC pulses, the gate voltage VGS_Q2 of the control terminal of the second switch component Q2 will not increase to the voltage level which is able to turn on the second switch component Q2.

From FIG. 4 we may know that the high gate voltages (VGS_Q3 and VGS_Q4) of the third and the fourth switch components Q3 and Q4 respectively reset the gate voltages (VGS_Q1 and VGS_Q2) of the first and the second switch components Q1 and Q2. When the AC power source is connected normally and provides electric power, the gate voltages (VGS_Q1 and VGS_Q2) of the first and the second switch components Q1 and Q2 are at low voltage level, thus the first and the second switch components Q1 and Q2 are not conductive. In addition, the third and fourth switch components Q3 and Q4 make use of high resistance control, thus there needs only extremely low power consumption for achieving the operations, and the conventional problems of high power consumptions of the resistors do not exist.

Figure 5:
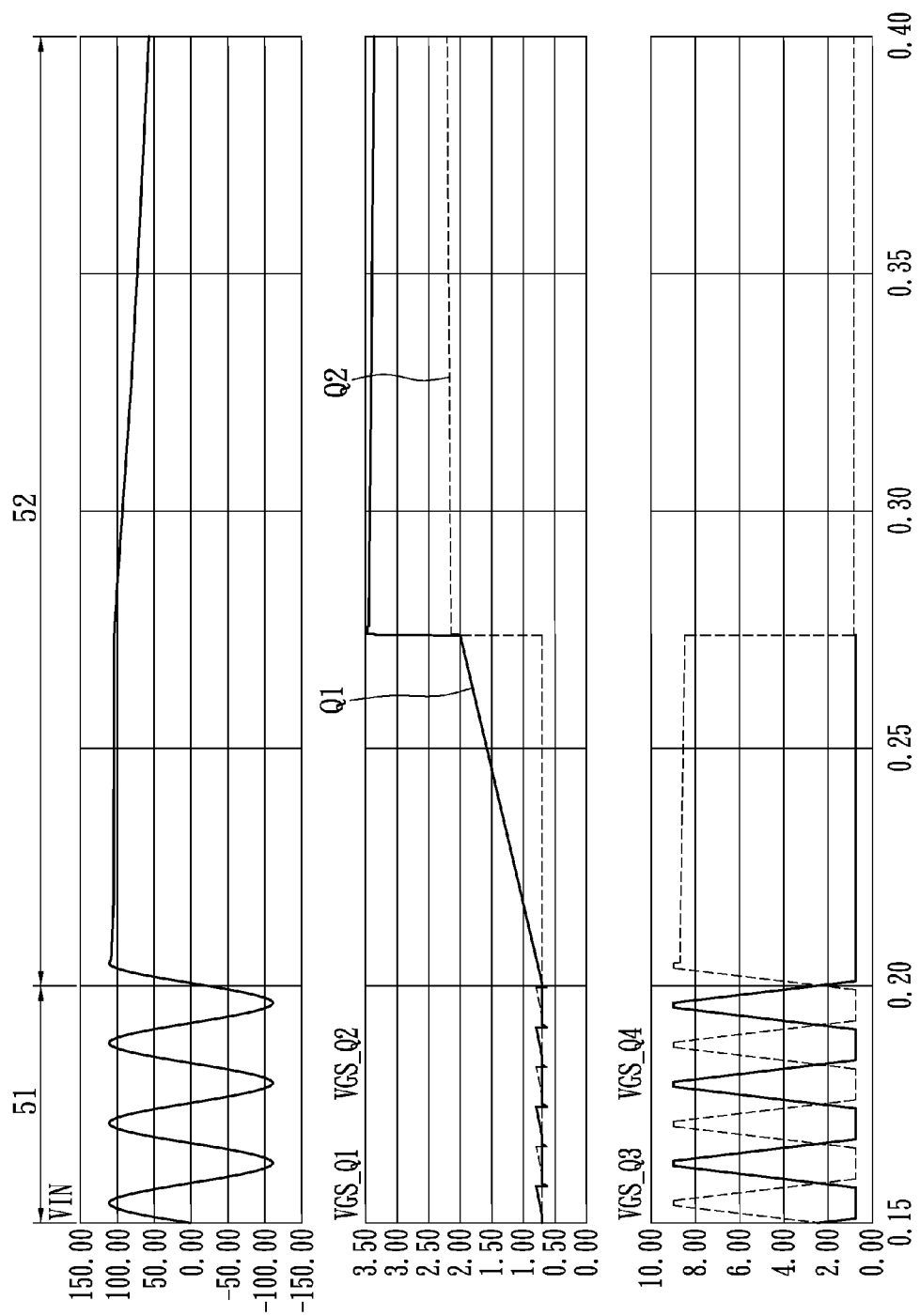
FIG. 5 shows a waveform diagram when the power supply of the AC power source is cut off according to an embodiment of the disclosure.

Please refer to FIG. 5 which shows an operation waveform diagram of the AC power source when the power supply is cut according to the present disclosure. Please refer to FIG. 5 along with FIG. 2. Within the first time interval 51 in FIG. 5, the AC power source provides electric power normally, and the operations of this part in this diagram are the same as in FIG. 4, thus not repeatedly described here. When the AC power source is removed and the operation enters into the time interval 52 in FIG. 5 and if the first input terminal L is positive and the second input terminal N is negative, the input voltage VIN is not changing along with the sine wave, and supplied instead by the input filtering capacitor CX. Thus, the capacitor C1 will be charged to higher voltage level for making the gate voltage VGS_Q1 of the control terminal of the first switch component Q1 reach the voltage level which is able to turn on the first switch component Q1. At this moment, the electric power stored in the input filtering capacitor CX passes through the resistor R1, the first switch component Q1, and the bridge rectifier 22 and returns to the second input terminal N, thus a first loop is completed, and the electric power stored in the input filtering capacitor CX is released to low voltage level.

In addition, the gate voltage VGS_Q1 of the first switch component Q1 increases to high voltage level, thus makes the first switch component Q1 turn on, and makes the input voltage VIN gradually decrease because of the bleeding path generated due to the conduction of the first switch component Q1, so as to attain the demand of safety specifications. Because the first loop formed from the resistor R1, the first switch component Q1, and the bridge rectifier 22 back to the second input terminal N only has a voltage difference (0.7V) of one diode, and the voltage difference between the first input terminal L (which has positive voltage) and the second input terminal N are much larger than the voltage difference (0.7V) of one diode, thus the current will flow along the first loop. Therefore, no matter whether the second switch component Q2 is turned on or off, it has no actual function.

On the other hand, if the AC power source 12 is removed when the first input terminal L is negative and the second input terminal N is positive, the capacitor C1 may be charged to higher voltage level which makes the gate voltage of the second switch component Q2 reach the voltage level which is able to turn on the second switch component Q2. At this moment, the electric power stored in the input filtering capacitor CX passes through the resistor R2, the second switch component Q2, and the bridge rectifier 22 and returns to the first input terminal L, so that the electric power in the input filtering capacitor CX is released to low voltage level.

In addition, the gate voltage VGS_Q2 of the second switch component Q2 increases to high voltage level, thus makes the second switch component Q2 turn on, and makes the input voltage VIN gradually decrease because of the bleeding path generated by the conduction of the second switch component Q2, so as to attain the demand of the safety specifications. Because the second loop formed from the resistor R2, the second switch component Q2, and the bridge rectifier 22 back to the first input terminal L only has the voltage difference (0.7V) of one diode, and the voltage difference between the second input terminal N (which has positive voltage) and the first input terminal L is much larger than the voltage difference (0.7V) of one diode, thus the current will flow along the second path, and no matter whether the first switch component Q1 is controlled to be turned on or off, it has no actual function.

At this moment, if the Zener diodes ZD1 to ZD4 are disposed at the gate nodes of the first to the fourth switch components Q1 to Q4 as shown in FIG. 3, the occurrence of an over voltage may be avoided for protecting the first to the fourth switch components Q1 to Q4. Moreover, the diodes D1 and D2 may be added for increasing the operation voltage of the gate nodes according to the actual applications, and the serially connected number thereof may be increased according to the actual situations.

Figure 6:
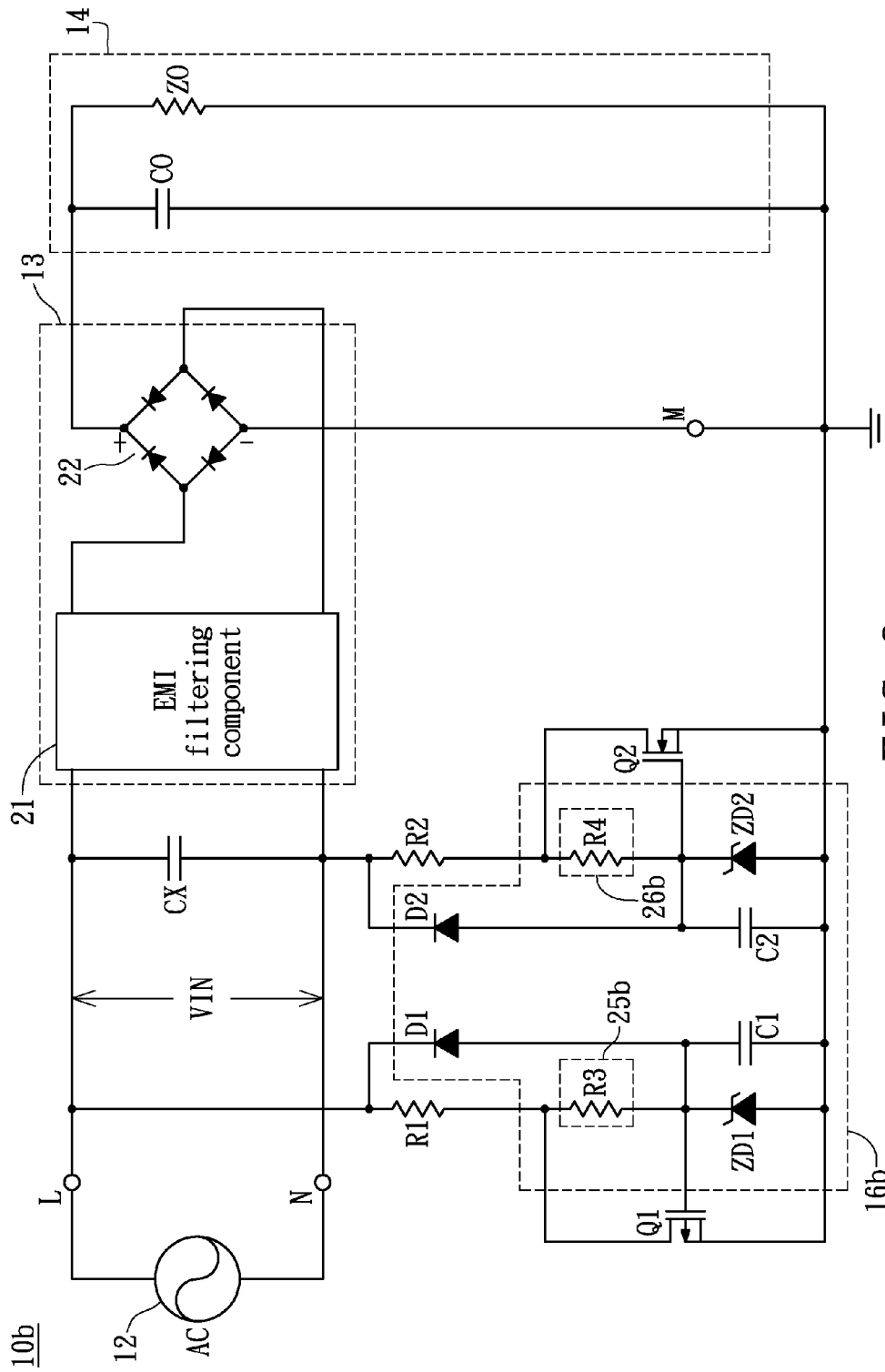
FIG. 6 shows another detail embodiment of an AC conversion system having a low power consumption bleeder circuit according to the disclosure.

Please refer to FIG. 6 which shows a circuit diagram of an AC conversion system having a low power bleeder circuit according to another embodiment of the present disclosure. Some parts of FIG. 6 are the same as in FIG. 3 and are not repeatedly described. The low power consumption bleeder circuit includes a first switch component Q1, a second switch component Q2, and a controller 16b. The differences between the controllers 16b in FIGS. 6 and 16a in FIG. 3 are that the controller 16b includes a first current controller 25b (which is represented by a resistor R3 here, and can also be changed to a current source I1), a first diode D1, a first capacitor C1, a second current controller 26b (which is represented by a resistor R4 here, and can also be changed to a current source 12), a second diode D2, and a second capacitor C2.

The resistor R3 is connected with the first resistor R1 and the control terminal of the first switch component Q1. The first diode D1 is connected with the control terminal of the first switch component Q1 and the first input terminal L of the AC power source 12. The first capacitor C1 is connected with the control terminal of the first switch component Q1 and the first connection terminal M of the rectifying filter 13. The resistor R4 is connected with the second resistor R2 and the control terminal of the second switch component Q2. The second diode D2 is connected with the control terminal of the second switch component Q2 and the second input terminal N of the AC power source 12. The second capacitor C2 is connected with the control terminal of the second switch component Q2 and the first connection terminal M of the rectifying filter 13.

In this embodiment, two diodes D1 and D2 are used for replacing the reset switches Q3 and Q4, so as to reset the first and the second capacitors C1 and C2 in the bleeder circuit. When the AC power source 12 is connected normally and provides electric power and if the phases of the AC pulses at the first input terminal L are positive and those at the second input terminal N are negative, the gate voltage of the first switch component Q1 charges the first capacitor C1 through the resistors R1 and R3. Because the resistors R1 and R3 are designed to have high resistances and form a high charging time constant with the first capacitor C1, and the phases of the AC pulses are alternatively changed, thus the gate voltage of the first switch component Q1 does not increase to the voltage level which is able to turn on the first switch component Q1. Thus, the input voltage VIN changes with the sine wave and is charged to a high value, then in accordance with the descending of the sine wave, the charging of the first capacitor C1 is stopped. When the phase of the sine wave changes to a negative phase, the first capacitor C1 is reset through the diode D1.

If the AC power source 12 is removed and the input voltage VIN does not change with the sine wave, the first capacitor C1 will be charged to higher voltage level, then the gate voltage of the first switch component Q1 reaches the voltage level which is able to turn on the first switch component Q1. At this moment, the electric power stored in the input filtering capacitor CX passes through the resistor R1, the first switch component Q1, and the bridge rectifier 22 and returns to the second input terminal N, then the electric power of the input filtering capacitor CX is released to low voltage level.

In addition, when the AC power source 12 is connected normally and provides electric power, and the phases of the AC pulses at the first input terminal L are negative and those at the second input terminal N are positive, then the gate voltage of the second switch component Q2 charges the second capacitor C2 through the resistors R2 and R4. Because the resistors R2 and R4 are designed to have high resistances and form a high charging time constant with the second capacitor C2, and the phases of the AC pulses are alternatively changing, thus the gate voltage of the second switch component Q2 will not increase to the voltage level which can turn on the second switch component Q2. Because the input voltage VIN is changed with the sine wave and charged to a high value and then decreases with the descending of the sine wave, thus the charging of the second capacitor C2 is stopped. When the phase of the sine wave changes to a negative phase, the second capacitor C2 is reset through the diode D2.

When the AC power source 12 is removed and the second capacitor C2 is charged which makes the gate voltage of the second switch component Q2 reach the voltage level being able to turn on the second switch component Q2, the electric power stored in the input filtering capacitor CX passes through the resistor R2, the second switch component Q2, and the bridge rectifier 22 and returns to the first input terminal L, then the voltage of the input filtering capacitor CX is released to low voltage level.

The gate nodes of the switch components Q1 and Q2 may respectively be added with the Zener diodes ZD1 and ZD2 as the protection components for avoiding an over voltage.

The low power consumption bleeder circuit or the AC conversion system according to the present disclosure controls the first switch component and the second switch component to turn on or off by means of a controller, thus high power consumption is avoided and complied with the demand of safety voltage specifications.

Some modifications of these examples, as well as other possibilities will, on reading or having read this description, or having comprehended these examples, occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A low power consumption bleeder circuit, coupled to an alternating-current (AC) power source, an input filtering capacitor, and a rectifying filter, wherein the input filtering capacitor and the rectifying filter are coupled to a first input terminal and a second input terminal of the AC power source, the low power consumption bleeder circuit comprising:
   a first switch component, coupled to the first input terminal of the AC power source and a first connection terminal of the rectifying filter;
   a second switch component, coupled to the second input terminal of the AC power source and the first connection terminal of the rectifying filter; and
   a controller, when detecting that the AC power source is removed, controlling at least one of the first switch component and the second switch component to be conductive,
   wherein the controller includes:
   a first detection terminal and a second detection terminal which are connected with a first resistor and a second resistor, for detecting the first input terminal and the second input terminal of the AC power source to determine whether the AC power source is removed or not;
   a first voltage divider circuit, connected with the second resistor;
   a second voltage divider circuit, connected with the first resistor;
   a third switch component, including a first terminal which is coupled to a control terminal of the first switch component; a second terminal which is coupled to the first connection terminal of the rectifying filter; and a control terminal which is coupled to the first voltage divider circuit;
   a fourth switch component, including a first terminal which is coupled to a control terminal of the second switch component; a second terminal which is coupled to the first connection terminal of the rectifying filter; and a control terminal which is coupled to the second voltage divider circuit;
   a capacitor, having two terminals which are respectively connected with the first terminal of the third switch component and the first terminal of the fourth switch component;
   a first current controller, connected with the first resistor and the control terminal of the first switch component; and
   a second current controller, connected with the second resistor and the control terminal of the second switch component.

2. The low power consumption bleeder circuit according to claim 1, wherein the first connection terminal of the rectifying filter is connected to a ground voltage.

3. The low power consumption bleeder circuit according to claim 1, wherein the first current controller and the second current controller are a resistor or a current source.

4. The low power consumption bleeder circuit according to claim 1, further comprising a first diode which is connected to the first terminal of the third switch component and the control terminal of the first switch component; and a second diode which is connected to the first terminal of the fourth switch component and the control terminal of the second switch component.

5. An alternating-current (AC) conversion system having a low power consumption bleeder circuit, comprising:
   an AC power source;
   an input filtering capacitor;
   a rectifying filter, wherein the input filtering capacitor and the rectifying filter are coupled to a first input terminal and a second input terminal of the AC power source;
   an output circuit, connected with a first connection terminal and a second connection terminal of the rectifying filter; and
   the low power consumption bleeder circuit including:
   a first switch component, coupled to the first input terminal of the AC power source and the first connection terminal of the rectifying filter;
   a second switch component, coupled to the second input terminal of the AC power source and the first connection terminal of the rectifying filter;
   and a controller, when detecting that the AC power source is removed, controlling at least one of the first switch component and the second switch component to be conductive,
   wherein the controller includes:
   a first detection terminal and a second detection terminal which are connected with a first resistor and a second resistor, for detecting the first input terminal and the second input terminal of the AC power source to determine whether the AC power source is removed or not;
   a first voltage divider circuit, connected with the second resistor;
   a second voltage divider circuit, connected with the first resistor;
   a third switch component, including a first terminal which is coupled to a control terminal of the first switch component; a second terminal which is coupled to the first connection terminal of the rectifying filter; and a control terminal which is coupled to the first voltage divider circuit;
   a fourth switch component, including a first terminal which is coupled to a control terminal of the second switch component, a second terminal which is coupled to the first connection terminal of the rectifying filter; and a control terminal which is coupled to the second voltage divider circuit;

a capacitor, including two terminals respectively connected with the first terminal of the third switch component and the first terminal of the fourth switch component;

a first current controller, connected with the first resistor and the control terminal of the first switch component; and a second current controller, connected with the second resistor and the control terminal of the second switch component.

6. The AC conversion system according to claim 5, wherein the rectifying filter includes:

a filtering component, coupled to the first input terminal and the second input terminal of the AC power source; and a rectifier, connected with the filtering component, the controller, and the output circuit.

7. The AC conversion system according to claim 5, wherein the output circuit includes:

an output capacitor; and an output impedance, connected in parallel with the output capacitor.

8. The AC conversion system according to claim 5, wherein the first connection terminal of the rectifying filter is connected with a ground voltage.

\* \* \* \* \*